Apr. 3, 1923.

J. F. NEUNABER ET AL 1,450,815

ROAD SCRAPER

Filed Dec. 12, 1921

2 sheets-sheet 1

Inventor
J. F. Neunaber + L. E. Bartels,

By
Attorney

Apr. 3, 1923.
J. F. NEUNABER ET AL
1,450,815
ROAD SCRAPER
Filed Dec. 12, 1921   2 sheets-sheet 2
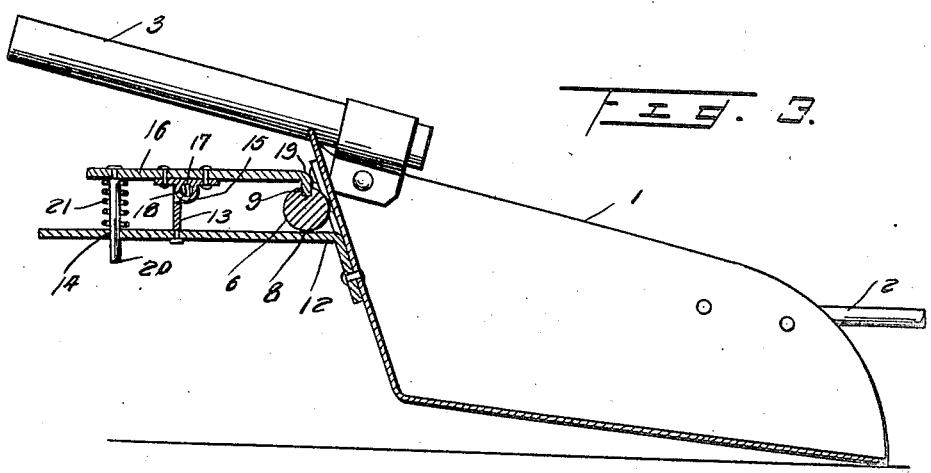
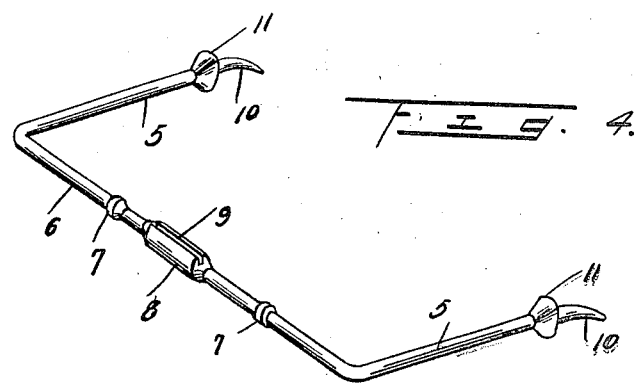
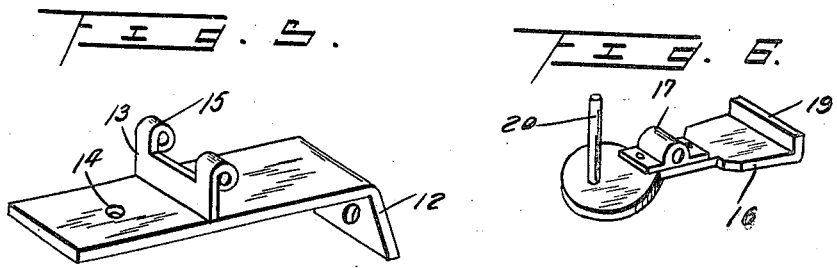
J. F. Neunaber + L. E. Bartels, Inventor Patented Apr. 3, 1923.

1,450,815

UNITED STATES PATENT OFFICE.

JOHN F. NEUNABER AND LOUIS E. BARTELS, OF BETHALTO, ILLINOIS.

ROAD SCRAPER.

Application filed December 12, 1921. Serial No. 521,743.

*To all whom it may concern:*

Be it known that we, JOHN F. NEUNABER and LOUIS E. BARTELS, citizens of the United States, residing at Bethalto, in the county of Madison and State of Illinois, have invented certain new and useful Improvements in Road Scrapers; and we do hereby declare the following to be a full, clear, and exact description of the invention, such as will enable others skilled in the art to which it appertains to make and use the same.

This invention has relation to shovels which are designed chiefly for road work when leveling the surface, or for other work entailing the moving of a quantity of earth, gravel or the like and the dumping of the same.

The present invention relates more particularly to the means whereby the scraper or shovel is automatically dumped after being manually tripped, whereby the force expended for dragging the shovel is also utilized as means for effecting automatic dumping thereof in conjunction with a device specially provided for this purpose.

Other objects and advantages will be apparent and suggest themselves as the nature of the invention is understood.

While the drawings illustrate an embodiment of the invention, it is to be understood that in adapting the same to meet different conditions and requirements, various changes in the form, proportion and minor details of construction may be resorted to without departing from the nature of the invention.

Figure 1:
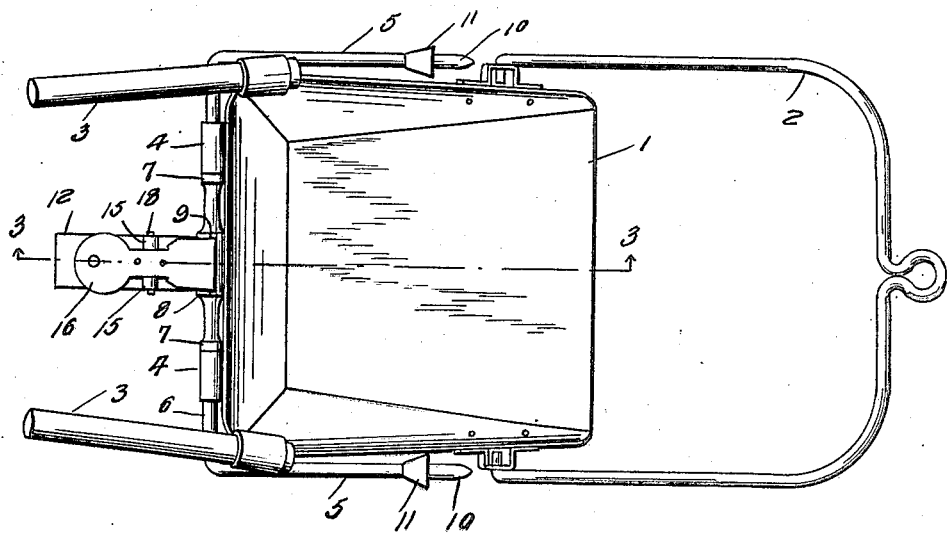
Figure 2:
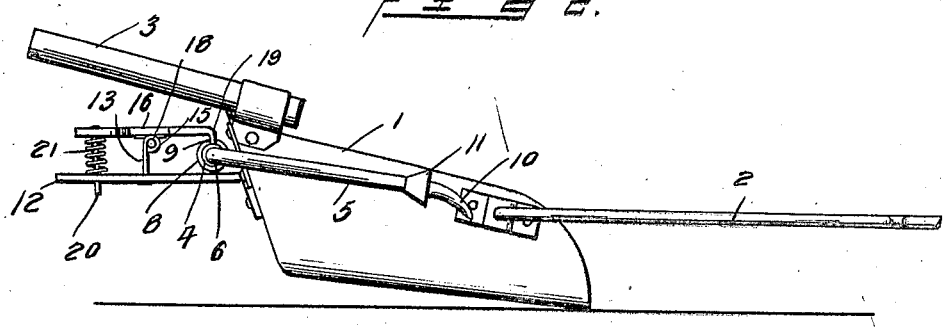

Referring to the accompanying drawings forming a part of the application,

Figure 1 is a top plan view of a road scraper or shovel embodying the invention, Figure 2 is a side view thereof, Figure 3 is a sectional detail on the line 3—3 of Figure 1, Figure 4 is a detail view of the dumping device, Figure 5 is a detail view of the arm to which the latch is pivoted, and Figure 6 is a detail view of the latch.

Corresponding and like parts are referred to in the following description and designated in the several views of the drawings by like reference characters.

The numeral 1 designates the shovel or scraper which is of ordinary construction and design. This shovel or scraper is adapted to be dragged over the road by means of a bail 2 which is attached thereto in any preferred way. Handle bars 3 are applied to the shovel in any usual manner to admit of manipulating the same when in operation.

Brackets 4, attached to the back of the shovel or scraper 1, extend rearwardly therefrom and pivotally support the dumping device. The dumping device is of U-form and comprises arms 5 and a cross piece 6, the latter being mounted in the brackets 4 and the arms 5 extending along the outer side of the shovel or scraper 1. Shoulders 7, formed on the cross piece 6, constitute annular stops which engage the brackets 4 and prevent longitudinal play of the cross piece 6. An enlargement 8, formed centrally of the cross piece 6, has a longitudinal groove 9 in its outer side which is adapted to cooperate with a latch and normally hold the dumping device in normal position and out of the way. The ends of the arms 5 are pointed and deflected downwardly, as indicated at 10, whereby to readily engage and penetrate the surface of the ground when the dumping device is brought into play. Guards 11 are formed on the arms 5 adjacent the pointed ends 10 and limit the penetration of the latter which is essential in the event of the surface being soft.

An arm 12, attached to the back of the shovel 1, extends rearwardly therefrom and receives a standard 13 and is formed with an opening 14 in the rear of the standard 13 to receive a guide pin. Spaced knuckles 15 are provided at the upper end of the standard 13. A latch 16 is pivotally mounted upon the standard 13 and has a knuckle 17 adapted to be received between the knuckles 15, the several knuckles being connected by means of a pivot pin 18. The forward end of the latch 16 is bent to provide a lip 19 which is adapted to enter the longitudinal groove 9 and normally hold the dumping device elevated so as not to interfere with the operation of the shovel 1 when dragged over the ground. A guide pin 20, depending from the rear end of the latch 16, passes through the opening 14 of the arm 12 and receives an expansible helical spring 21 whereby the rear portion of the latch 16 is pressed upwardly to normally hold the lip 19 in the groove 9.

When the shovel or scraper is in operation, it is dragged over the ground by means of the bail 2, the dumping device being held elevated and out of the way, as indicated most clearly in Figure 2. After the shovel 1 has received a load and it is required to dump the same, the latch 16 is tripped, whereby the lip 19 is withdrawn from the groove 9. The dumping device, being thus released, assumes an operative position by the weight of the arms 5 which drop and bring their pointed ends 10 into contact with the ground, and in a continued forward movement of the shovel, the arms 5 tilt and elevate the rear portion of the shovel with the result that the load is automatically dumped. The overturning of the shovel 1 in the dumping thereof returns the dumping device to normal position, in which it is retained by the action of the latch 16 in the engagement of its lip 19 with the groove 9.

What is claimed is:

1. In combination with a shovel or road scraper, brackets extending rearwardly from the back wall thereof, a dumping device mounted in said brackets and embodying side arms and a cross piece, the latter having stops in cooperative relation with the brackets to prevent longitudinal play of the cross piece, and a latch carried by the shovel and adapted to engage said cross piece to normally hold the dumping device out of operative position.

2. In combination, a shovel, brackets extending rearwardly from the back wall thereof, a dumping device mounted in said brackets and including side arms and a cross piece, the latter having a circular enlargement formed in its outer side with a longitudinal groove, and a latch carried by the shovel and having a lip normally engaging the groove in the circular enlargement of the dumping device to normally hold the latter in elevated position and out of the way.

3. In combination, a shovel, brackets extending rearwardly from the back wall thereof, a U-shaped dumping device mounted in said brackets and having the cross piece formed with stops in engagement with the brackets and with a circular enlargement having a longitudinal groove, an arm extending rearwardly from the back wall of the shovel and provided with a standard, a latch pivotally mounted upon the standard and having a lip at its forward end to engage the groove in the circular enlargement of the dumping device, a pin depending from the rear end of the latch and passing loosely through an opening formed in said arm, and an expansible helical spring mounted upon said pin and confined between the latch and arm.

In testimony whereof we affix our signatures in presence of two witnesses.

JOHN F. NEUNABER.
LOUIS E. BARTELS.

Witnesses:
HENRY W. ZIMMERMANN,
JOHN G. KLEIN.